United States Patent [19]

Mortenson

[11] 3,997,182
[45] Dec. 14, 1976

[54] TWO-WHEELED HAND TRUCKS

[75] Inventor: Carl N. Mortenson, Midland, Mich.

[73] Assignee: Magline, Inc., Pinconning, Mich.

[22] Filed: May 27, 1975

[21] Appl. No.: 581,212

[52] U.S. Cl. .................... 280/47.27; 280/5.24; 40/16.4
[51] Int. Cl.² .................... B62B 5/02
[58] Field of Search ........ 280/47.27, 47.28, 47.29, 280/5.2, 5.24, 5.32; 40/16.4

[56] References Cited

UNITED STATES PATENTS

| | | | |
|---|---|---|---|
| 2,612,379 | 9/1952 | Vogel | 280/5.24 |
| 2,689,421 | 9/1954 | Lesniak et al. | 40/16.4 |
| 3,079,168 | 2/1963 | Monroe et al. | 280/47.28 |
| 3,788,659 | 1/1974 | Allen | 280/47.27 |

OTHER PUBLICATIONS

"American Machinist," Plant Service Equipment, p. 363, Jan. 21, 1943.

Primary Examiner—Robert R. Song
Assistant Examiner—R. Schrecengost

[57] ABSTRACT

A two-wheeled hand truck or dolly structure wherein a primary frame is mounted on a pair of wheels and a generally forwardly disposed nose part is connected to project forwardly from the primary frame. The primary frame is made up of side rails connected by cross rails and one of the improvements is concerned with the shape of the side and cross rails which are configured so that they may receive elongate semi-rigid strips bearing information of an advertising or identifying character.

18 Claims, 19 Drawing Figures

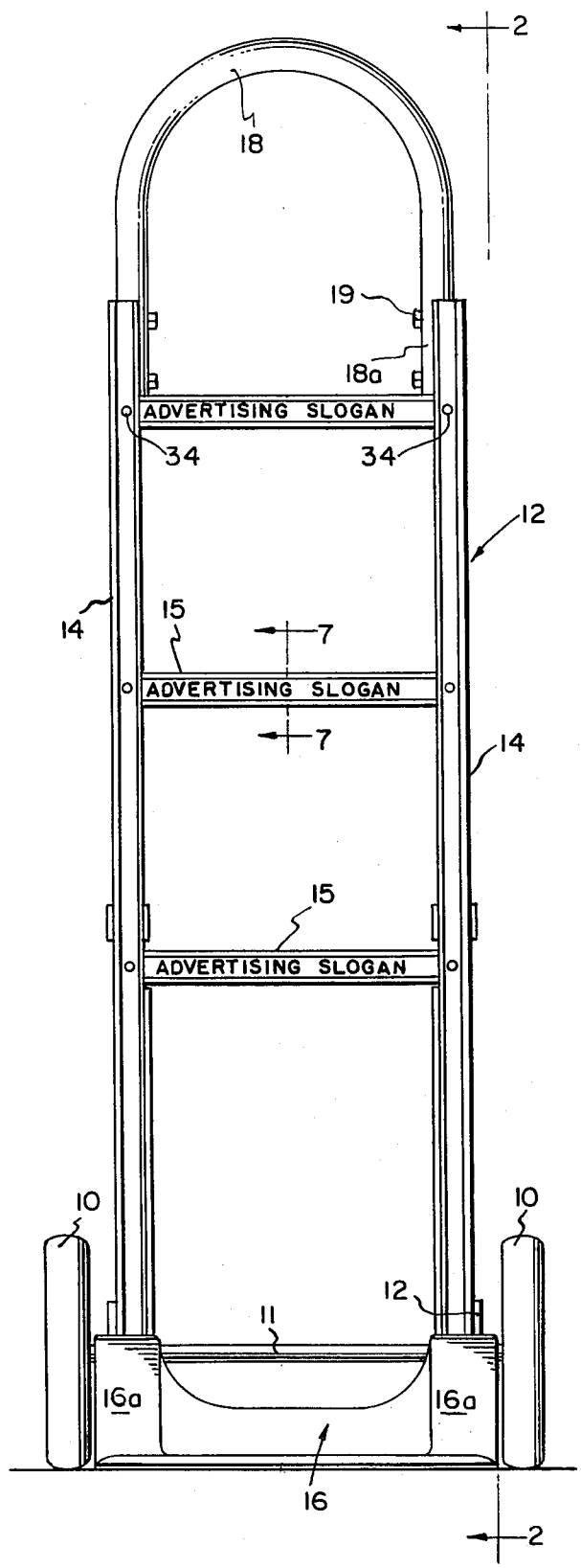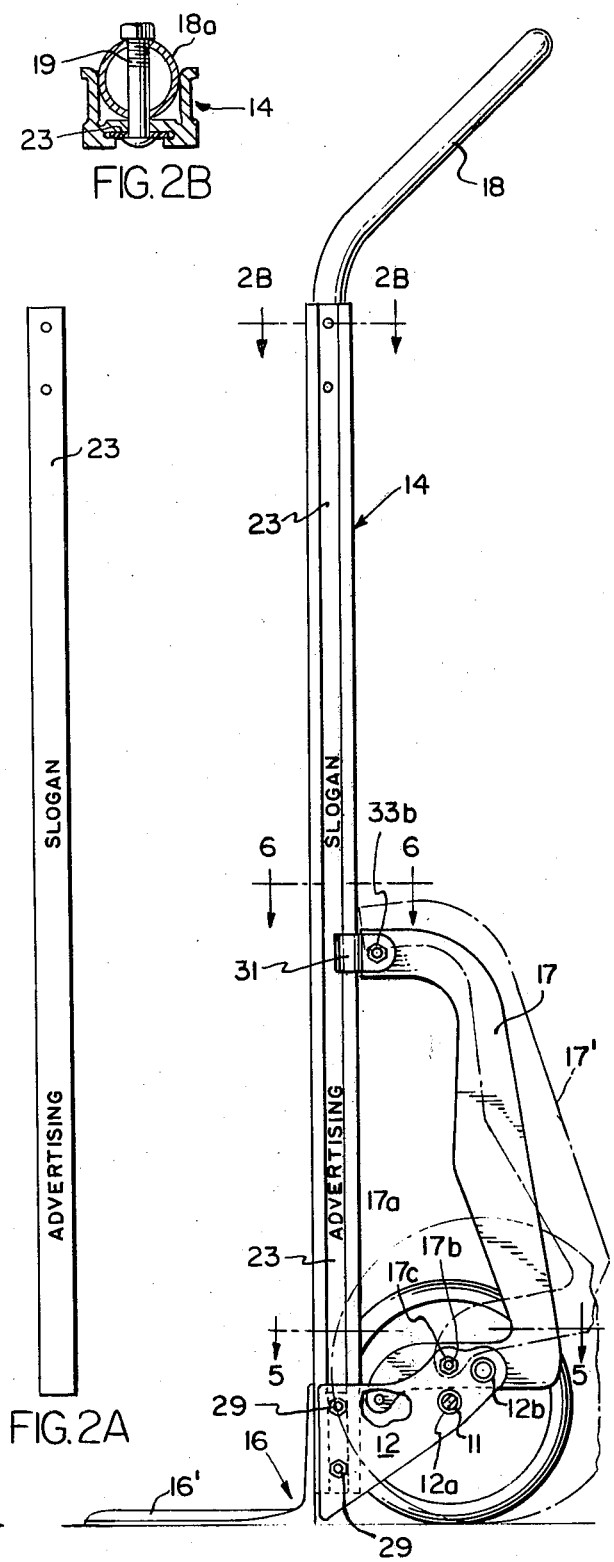

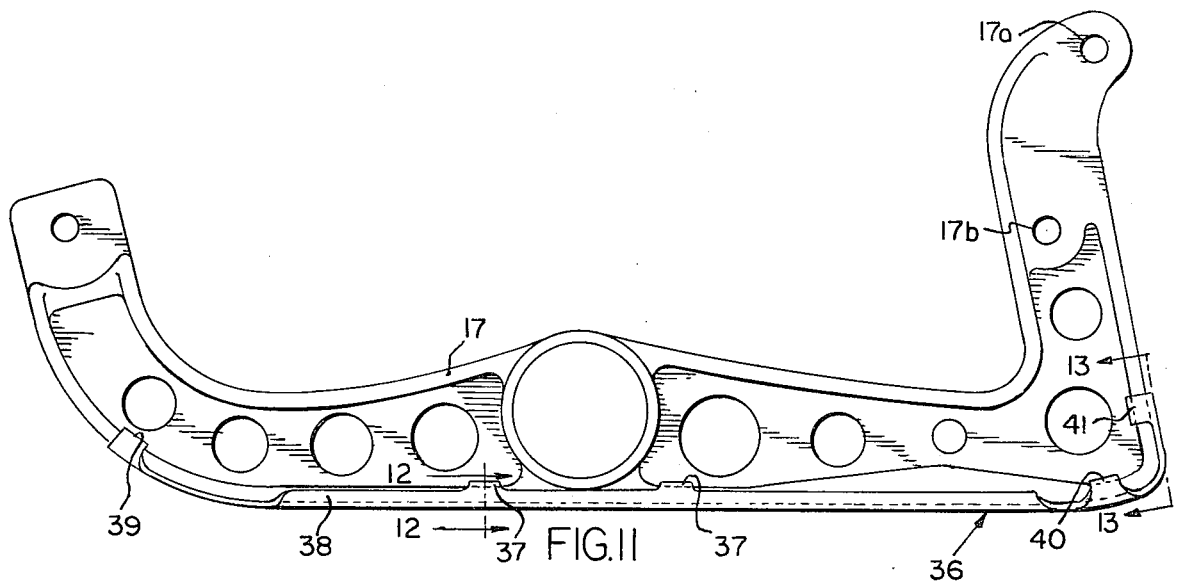
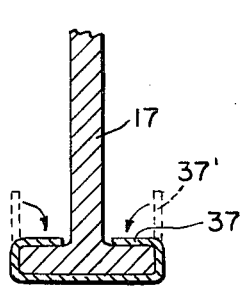
FIG.12
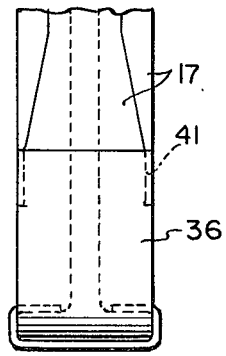
FIG.13
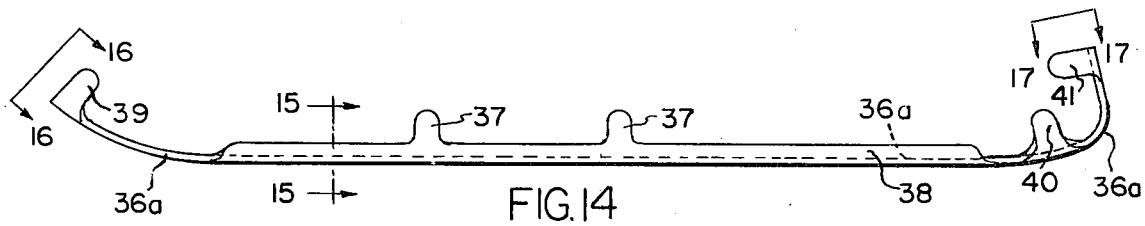
FIG.14
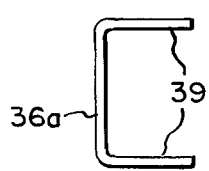
FIG.16
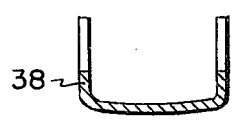
FIG.15
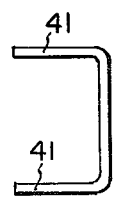
FIG.17

TWO-WHEELED HAND TRUCKS

BACKGROUND OF THE INVENTION

1. Field of the Invention

This invention relates to two-wheeled hand trucks or dollies of the type wherein a primary frame, mounted on a pair of wheels, is adapted in use to assume a generally vertical position and has a generally forwardly disposed nose part connected to project forwardly from the primary frame to receive an object to be carried by the hand truck.

2. Description of the Prior Art

Hand trucks of varying design have been proposed and patented and are exemplified by the following listed U.S. Pat. Nos. which applicant wishes to make of record:

3,788,659; 2,689,421; 2,263,879
3,785,699; 2,396,953; 1,820,669
3,642,301; 2,362,273; 1,513,045
3,079,168; 2,318,231; 1,192,790.

While these prior patents relate to various hand-truck designs none disclose structure capable of carrying elongate information-bearing semi-rigid strips and indeed none of these prior patents even suggest the concept. Further, it is evident from a study of these prior patents that the hand trucks of the prior art may be improved upon to a significant degree and it is to this end that the inventive principles shown and described herein are directed.

SUMMARY OF THE INVENTION

The hand truck of the present invention includes a primary frame, mounted on a pair of wheels, and adapted in use to assume a generally vertically inclined position. It has a forwardly projecting nose part which extends from the lower end of the primary frame and, at its upper end, incorporates a handle which can be grasped by the user to propel the truck. The primary frame consists of an open framework, with side rails connected by cross rails, and, in one improved form of the invention, the side and cross rails are formed with an exposed, generally T-shaped slot defined by laterally projecting opposed flanges. Such slots are provided on the outboard sides of the side rails, and may also be provided on the front side of the cross rails, to accommodate semi-rigid information-bearing strips.

As will be apparent from the foregoing, one of the primary objects of the invention is to provide a hand truck which is so constructed that it will advertise the product of the party using the hand truck or identify the hand truck user, as he may desire.

Other improvements are concerned with the axle mounted brackets, which are carried by an axle connecting the wheels, and mount to the lower ends of the side rails in an improved manner.

Still other improvements are concerned with the stair climbers, which are disclosed as attached to the axle-mounted brackets at their lower ends and to the side rails at their upper ends.

A still further object of the invention is to provide a very simple, practical and economical hand truck of improved character which can be effectively utilized to transport a wide variety of products from one place to another.

DESCRIPTION OF THE DRAWINGS

FIG. 1 is a front elevational view of an improved hand truck constructed in accordance with my invention;

FIG. 2 is a side elevational view thereof taken on the line 2—2 of FIG. 1, the chain lines indicating an alternative position of the stair climber members;

FIG. 2A is a side elevational view of the informational strip only;

FIG. 2B is a transverse sectional view, taken on the line 2B—2B of FIG. 2;

FIG. 11 is a side elevational view illustrating a modified form of stair climber for the hand truck;

FIG. 12 is a transverse sectional view taken on the line 12—12 of FIG. 11;

FIG. 13 is an end elevational view taken on the line 13—13 of FIG. 11;

FIG. 14 is a side elevational view of the wear strip only;

FIG. 15 is a transverse sectional view taken at the line 15—15 of FIG. 14;

FIG. 16 is an end elevational view taken at the line 16—16 of FIG. 14; and

FIG. 17 is a top plan view taken at the line 17—17 of FIG. 14.

Figure 3:
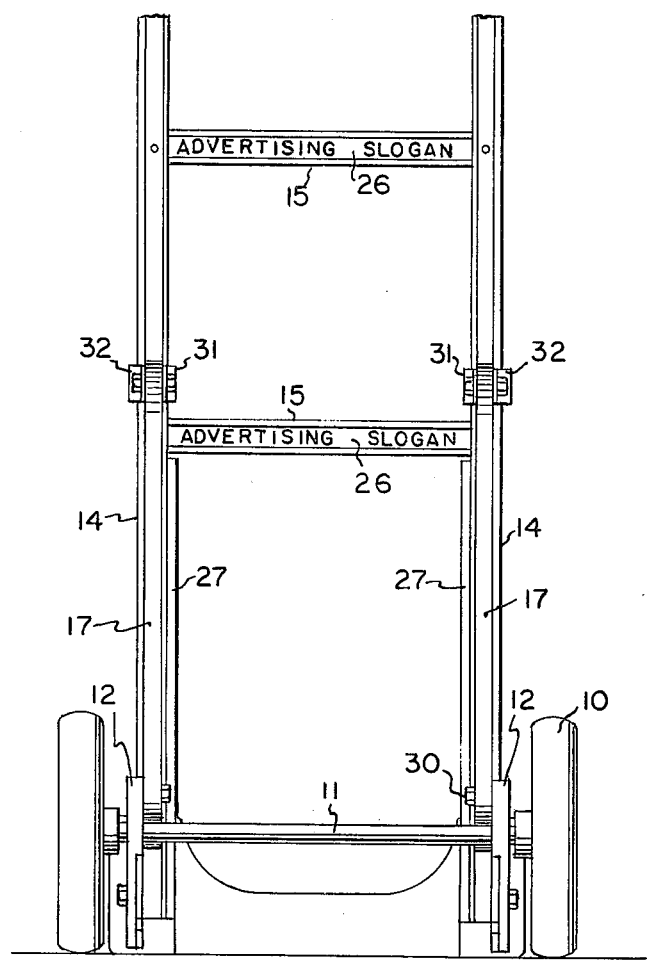
FIG. 3 is a rear elevational view thereof.

Referring now more particularly to the accompanying drawings, and in the first instance to FIGS. 1 through 7 thereof, the hand truck of the present invention is shown as comprising generally a pair of preferably rubber tired wheels 10, mounted on an axle 11. Brackets 12 have the usual hubs 12a, for receiving the ends of axle 11, and extend forwardly to mount to the lower ends of a primary frame, generally designated 13, which, as shown, comprises an open framework made up of side rail members 14 connected by cross rail members 15. Projecting forwardly from the primary frame 13 is an angle-shaped nose piece generally designated 16, having a forwardly extending lip or apron 16′ upon which the article to be transported may be supported in the usual manner.

As FIG. 2 indicates, an alternate hub 12b is also provided on each bracket 12 to accommodate the axle 11 when a wheel 10 of larger diameter is employed. In addition to the members described, U-shaped stair climber members, generally designated 17, are utilized and mount to the brackets 12, and to the side rails 14, in a manner which will be more particularly described later.

Figure 5:
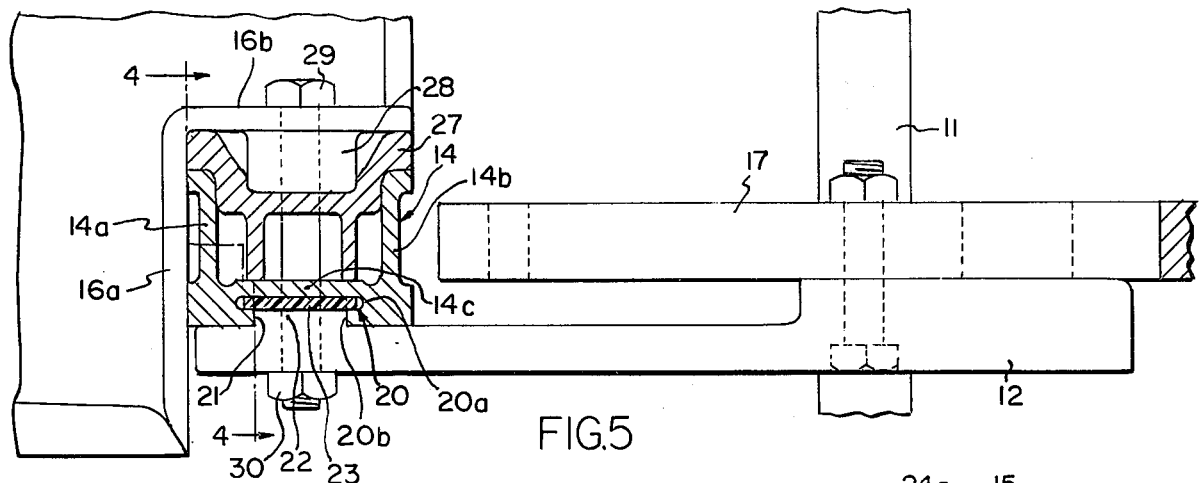
FIG. 5 is a considerably enlarged, sectional fragmentary top plan view taken on the line 5—5 of FIG. 2.
Figure 6:
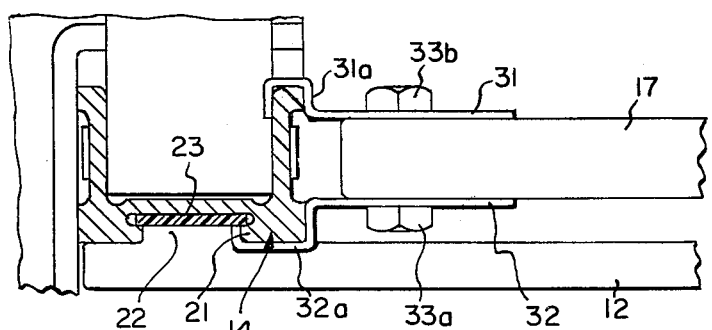
FIG. 6 is a considerably enlarged, fragmentary top plan view taken on the line 6—6 of FIG. 2.

It is important to understand that carts of this character must be constructed of light-weight material such as aluminum, and constructed very economically. Accordingly, extrusions of the configuration particularly shown in FIGS. 5 and 6 are employed as side rails 14. As FIGS. 5 and 6 indicate, the extruded side rails 14 are generally U-shaped in cross section and include front and rear sides 14a and 14b respectively, connected by a web part 14c. A bale-shaped handle member 18, which inclines rearwardly as shown particularly in FIG. 2, has free ends 18a, which are received in the upper ends of the U-shaped side rails 14, and may be bolted thereto as shown at 19 (FIG. 2B).

Figure 4:
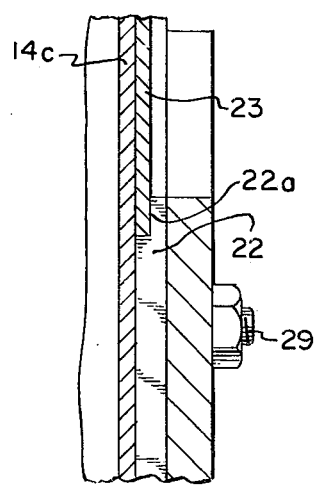
FIG. 4 is a sectional fragmentary elevational view taken on the line 4—4 of FIG. 5.

The outboard faces of the web portions 14c of each side rail 14 are provided with T-shaped slots (FIG. 6), generally designated 20, which include enlarged head portions 20a and reduced size neck portions 20b, defined by projecting flanges 21 which, like slots 20, extend the full length of the side rails 14. The brackets 12 are provided with key portions 22 of a depth to be received within the enlarged portions 20a of T-slots 20 and the slots 20 also accommodate semi-rigid strips 23 which extend all the way from the upper ends of rails 14 down into abutting engagement with the upper surface of key portions 22, the upper end of key 22 being slotted as at 22a to accommodate the lower end of strip 23 and securely affix it in position as shown in FIG. 4.

Figure 7:
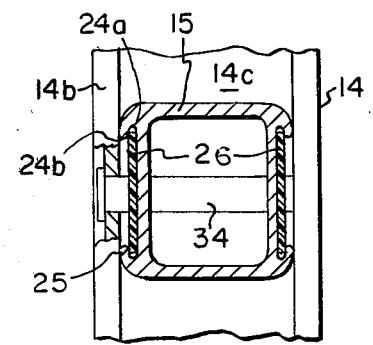
FIG. 7 is an enlarged, fragmentary, transverse sectional view taken on line 7—7 of FIG. 1.

In like manner, and as shown particularly in FIG. 7, the extruded tubular cross pieces 15 are provided with T-slots 24 on their front and rear faces which similarly comprise enlarged portions 24a and reduced size neck portions 24b, defined by overlying flanges 25. Similar semi-rigid strips 26 are accommodated in the portions 24a of slots 24 and extend from one end of each cross rail 15 to the other.

It is to be understood that the strips 23 and 26 are plastic strips of about 1/16 inch in thickness which are designed to bear advertising material, identifying material, or such other informational material as the user of the cart may desire. Preferably, they are colored strips to contrast with the silver metallic color of cross rails 15 and side rails 14, and for purposes of convenience, are shown in applicant's drawings as carrying printing designated as "advertising slogan" or "identification." The plastic used may be polyvinylchloride or any form of a number of known plastic which is suitable for the purpose.

The nose piece, generally designated 16, includes rear facial portions 16a (see FIGS. 1 and 5) which butt against the side rails 14, as shown particularly in FIG. 5, and inboard flange extensions 16b, which abut fitting strip members 27. Hubs 28 are cast on nose parts 16b and permit bolts and nuts 29 and 30, respectively to rigidity clamp the brackets 12 and nose pieces 16 securely to the side rails 14. The bolts 29 extend through the key portions 22 of brackets 12 at a point below the strips 23 as shown in FIG. 4.

At their lower ends the stair climbers 17 are shown as having a pair of alternate mounting holes 17a and 17b. With the smaller diameter wheels 10 shown, it is the holes 17b which are utilized and releasable fastener member such as bolts 17c are employed to secure the stair climbers securely to the brackets 12. If larger diameter wheels are utilized, then the position of stair climbers 17 would be adjusted so that it would be the holes 17a which would be used for attaching bolts 17c and securing the stair climber members 17 in the adjusted position illustrated by the chain lines 17' in FIG. 2.

At their upper ends the stair climbers 17 are connected with a pair of inner and outer clip members 31 and 32 (FIG. 6), respectively, by way of releasable bolts and nuts 33a and 33b, respectively. Each inboard clip 31 includes a U-shaped end 31a, sized to fit over the flanged free outer end of the leg part 14b of one of the side rails 14. Similarly, the outboard clips 32 have U-shaped ends 32a, configured to fit over the rear flanges 21 on each side rail 14 and bear against the strips 23 as shown in FIG. 6. The stair climber member 17, shown in FIG. 2, can be moved to the position shown in chain lines 17', only of course, if the nuts 33b are backed off sufficiently to permit the clips 31 and 32 to slide upwardly along side rails 14.

Figure 8:
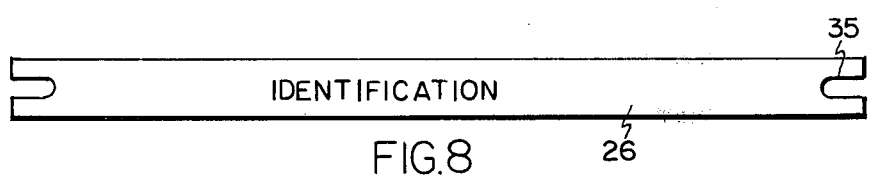
FIG. 8 is an elevational view of a modified form of strip.
Figure 9:
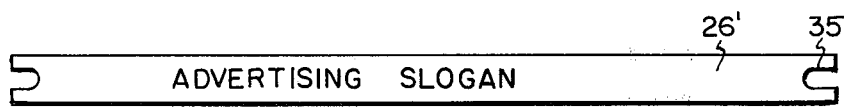
FIG. 9 is a still further view of a modified form of strip.
Figure 10:
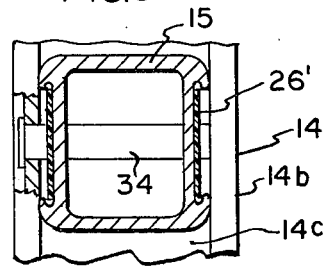
FIG. 10 is a transverse sectional view showing the strip of FIG. 9 mounted in position.

The plastic strips 26, carried by cross rails 15, extend the full length of rails 15 and may be provided with bores to receive rivets 34 (FIG. 7) which secure them in position. They may, however, also be formed as shown in FIG. 8 with elongate slots 35. Further, in an alternative form of the invention, an after insertion of narrower strips 26' may be accomplished with slots 35 similarly accommodating the rivets 34. Preferably, in this embodiment, a strong tacky adhesive will be used on the back of the strips shown in FIG. 9 to secure them in position.

In FIG. 11 a stair climber 17 is shown as having a wear strip, generally designated 36, applied to its rear edge. For the sake of clarity, the wear strip 36 was not shown in FIGS. 2 and 3, however it is of the configuration disclosed in FIG. 14, wherein it is shown as having a base or backer section 36a with bent-over pairs of central tabs 37 provided on abbreviated side wall sections 38, and bent-over tabs 39 provided at one end of base section 36a, with bent-over tabs 40 and 41 provided at the other. FIGS. 12 and 13 particularly illustrate the manner in which these tabs are bent over from the 37' position to accommodate to the cross section of the stair climber 17 which is particularly illustrated also in these views.

The operation of carts of this character is well known and need not be particularly described. With the embodiment shown in FIGS. 1 through 8, the strips 23 and 26 are applied during manufacture of the cart to suit the specifications of the particular customer by slipping the strips 23 in the upper ends of side rails 14, prior to bolting handle 18 and strips 23 in position, and by slipping strips 24 into cross rails 15 so that the rivet openings therein line up with like openings in the rails 15 prior to riveting the cross rails 15 and strips 24 in position on side rails 14. The strips 23 are provided with openings 23' or slots 35 to accommodate bolts 19. The strips 26'can, as indicated, be after-inserted if desired.

The nose piece 16, bracket 12 and side rail 14 connection, particularly illustrated in FIG. 5, is extremely stout and rigid and it is, of course, the configuration of these keyed, interfitting parts which is responsible. With the new keyed construction, the shear stresses on the clamping bolts are relieved. Moreover, because the brackets 12 are pieces separate from the nose part 16, the nose part can be die cast rather than sand cast and the nose parts 16 can be easily changed where a different size or configuration is desired. When the user desires to employ a different diameter wheel, the position of stair climbers 17 can be adjusted by simply removing the bolts 17c while, at the same time, backing off nuts 33b. This is not possible in prior art constructions wherein the stair climbers were mounted on the axle. The application of the wear strips 36 is easily accomplished by inserting the wear strip member, shown particularly in FIG. 14, over the rear edge of each stair climber 17, and then bending over the tabs 37 through 41.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. In a two-wheeled hand truck or dolly structure including: a pair of wheels; a primary frame, adapted in use to assume a generally vertical position, supported by said wheels; a generally forwardly disposed nose part supported by said wheels and connected to project forwardly from the primary frame to receive an object to be carried thereon; said frame at its upper end incorporating a handle portion which can be grasped by the users to propel the truck, along with the product carried by the nose part resting back against the primary frame; said frame comprising an open framework with side rails connected by cross rails; the improvement wherein at least one of said side and cross rails is formed with an exposed generally T-shaped slot of predetermined depth extending from end to end thereof and comprising an enlarged width head portion defined by projecting flanges and a reduced width neck portion; and an elongate semi-rigid strip bearing information of an advertising or identifying character on its outer face and of a thickness less than the depth of said slot is received by the head portion of the slot and secured in recessed protected position in the slot.

2. The structure as set forth in claim 1 wherein the front and rear sides of said cross rail have the slot and strip.

3. In a two-wheeled hand truck or dolly structure including: a pair of wheels; a primary frame adapted in use to assume a generally vertical position supported by said wheels; a generally forwardly disposed nose part supported by said wheels and connected to project forwardly from the primary frame to receive an object to be carried thereon; said frame at its upper end incorporating a handle portion which can be grasped by the user to propel the truck, along with the product carried by the nose part resting back against the primary frame; said frame comprising an open framework with side rails connected by cross rails; an axle connecting said wheels; and axle mounted brackets extending forwardly toward the nose part; the improvement wherein the side rails have outboard sides provided with external grooves, the brackets have key parts thereon snugly received by the grooves in the lower ends of the side rails; and means clamps said key parts within the grooves in the lower ends of said side rails.

4. The structure as set forth in claim 3 wherein the side rails comprise inwardly facing U-shaped sections with outwardly disposed leg-connecting webs, and the webs have outboard sides provided with T-slot shaped grooves, said bracket keys being shaped to be snugly received thereon; said nose part having side flanges abutting the inboard sides of said side rails; and bolts through said keyed portions, side rails, and side flanges to clamp the parts securely together.

5. The structure as set forth in claim 4 wherein said side flanges have outwardly projecting bosses to pass said bolts, and fitting elements received by the U-shaped side rails have sockets to snugly receive said bosses.

6. In a two-wheeled hand truck or dolly structure: a pair of wheels; a primary frame adapted in use to assume a generally vertical position supported by said wheels; a generally forwardly disposed nose part supported by said wheels and connected to project forwardly from the primary frame to receive an object to be carried thereon; said frame at its upper end incorporating a handle portion which can be grasped by the user to propel the truck, along with the product carried by the nose part resting back against the primary frame; said frame comprising an open framework with side rails connected by cross rails; an axle connecting said wheels; axle mounted brackets connected with the nose part to the primary frame side rails; and stair climbers having upper ends releasably clamped to the side rails and lower ends with alternate openings, one set of which is clamped to the brackets.

7. In a two-wheeled hand truck or dolly structure including: a pair of wheels, a primary frame adapted in use to assume a generally vertical position supported by said wheels; a generally forwardly disposed nose part supported by said wheels and connected to project forwardly from the primary frame to receive an object to be carried thereon; said frame at its upper end incorporating a handle portion which can be grasped by the user to propel the truck, along with the product carried by the nose part resting back against the primary frame; said frame comprising an open framework with side rails connected by cross rails; an axle connecting said wheels; and stair climbers having upper ends secured to the side rails and lower ends supported by the axle such that their rear surfaces are substantially peripherally flush with the diameter of the wheels; the improvement wherein said stair climbers comprise a web part with an outer stair engaging flange of enlarged width; metallic backer strips are provided for the backs of the stair climbers, shaped to the configuration thereof and in facial engagement therewith, and releasable bent over tabs secure their front and rear ends thereto.

8. The structure as set forth in claim 7 wherein sets of opposed tabs are bent from each side of the backer strip over the flange.

9. The structure as set forth in claim 8 in which the backer strips extend along the intermediate portion of the U-shaped stair climbers and the lower ends of said backer strips have angularly extending parts to conform to the lower leg parts of said stair climbers; sets of tabs being provided at the ends of said angularly extending parts.

10. In a two-wheeled hand truck or dolly structure including: a pair of wheels, an axle connecting said wheels; a primary frame, adapted in use to assume a generally vertical position, supported by said wheels; a generally forwardly disposed nose part supported by said wheels and connected to project forwardly from the primary frame to receive an object to be carried thereon; said frame comprising an open framework with side rails connected by cross rails and at its upper end incorporating a handle portion which can be grasped by the user to propel the truck, along with the product carried by the nose part resting back against the primary frame; axle mounted brackets extending forwardly toward the nose part and mounted to the lower ends of said side rails; means for securing the brackets to the side rails; the improvement wherein at least one of said side rails is formed with an exposed, generally T-shaped slot from one end to the other comprising an enlarged width head portion defined by projecting flanges and a reduced width neck portion; at least one of said brackets has a projecting key part received in said head portion of the slot via said neck portion; and an elongate semi-rigid strip bearing information of an advertising or identifying character on its outer face is received by the head portion of the slot and has side edges underlying and retained by the flanges.

11. The structure as set forth in claim 10 wherein said strip at its lower end is received within a recess in said key part.

12. The structure as set forth in claim 11 wherein clamp members secure the upper end of said strip in position.

13. The structure as set forth in claim 10 in which said side rails comprise generally U-shaped lightweight metal extrusions, with said T-slot provided in each on the outboard face of the connecting web of each generally U-shaped extrusion.

14. The structure set forth in claim 13 in which said cross rails have ends received in the open sides of said generally U-shaped sections and cross rail securing members extend through the sides of said generally U-shaped sections and through said cross rail ends to secure them in position; there being also an elongate semi-rigid strip bearing information of an advertising or identifying character provided in a T-slot in at least one outer face of a cross rail and having an opening to pass said securing members.

15. The structure as set firth in claim 10 wherein stair climber members have lower ends releasably secured to said brackets and upper ends releasably secured to said rails but mounted for telescopic sliding movement along said rails when the ends of said climber members are released.

16. The structure as set forth in claim 15 wherein the lower ends of said stair climber members have a plurality of openings to attach differently to said brackets dependent on the diameter of wheel being employed and said sliding movement on aid side rails takes place during change-over from one wheel diameter to another.

17. The structure as set forth in claim 10 wherein said axle mounted brackets extend forwardly to mount to the outboard sides of the lower ends of said side rails; the nose part has rearwardly extending flanges adapted to extend along the inboard sides of said side rails; and securing members are provided to secure the brackets and flanges to said side rails.

18. In a two-wheeled hand truck or dolly structure including: a pair of wheels, an axle connecting said wheels; a primary frame, adapted in use to assume a generally vertical position, supported by said wheels; a generally forwardly disposed nose part supported by said wheels and connecting to project forwardly from the primary frame to receive an object to be carried thereon; said frame comprising an open framework with side rails connected by cross rails and at its upper end incorporating a handle portion which can be grasped by the user to propel the truck, along with the product carried by the nose part resting back against the primary frame; axle mounted brackets extending forwardly toward the nose part and mounted to the lower ends of said side rails; the improvement wherein the nose part and brackets are separately fabricated parts with the nose part having fore to aft extending vertical walls inboard of the sides of said side rails opposite bracket walls outboard of the sides of said side rails; and means for clamping the brackets, nose vertical walls, and side rails in assembled position.

* * * * *

UNITED STATES PATENT AND TRADEMARK OFFICE
CERTIFICATE OF CORRECTION

PATENT NO. : 3,997,182
DATED : December 14, 1976
INVENTOR(S) : Carl N. Mortenson It is certified that error appears in the above-identified patent and that said Letters Patent are hereby corrected as shown below:

Column 1, line 20, change "3,785,699" to -- 3,785,669 -- .

Column 1, line 48, change "side" to -- sides -- .

Column 3, line 50, change "rigidity" to -- rigidly -- .

Column 5, line 34, after "rail" insert -- each -- .

Column 5, line 60, change "thereon" to -- therein -- .

Column 7, line 31, change "firth" to -- forth -- .

Column 8, line 5, change "aid" to -- said -- .

Column 8, line 19, change "connecting" to -- connected -- .

Signed and Sealed this

Eighth Day of March 1977

[SEAL]

Attest:

RUTH C. MASON
Attesting Officer

C. MARSHALL DANN
Commissioner of Patents and Trademarks